United States Patent [19]

Kojima et al.

[11] Patent Number: 4,723,206
[45] Date of Patent: Feb. 2, 1988

[54] VECTOR PROCESSOR

[75] Inventors: Keiji Kojima, Kokubunji; Shunichi Torii, Musashino; Noriyasu Ido, Yokohama, all of Japan

[73] Assignee: Hitachi, Ltd., Tokyo, Japan

[21] Appl. No.: 737,686

[22] Filed: May 24, 1985

[30] Foreign Application Priority Data

May 25, 1984 [JP] Japan .................................. 59-104543

[51] Int. Cl.⁴ ............................................ G06F 15/347
[52] U.S. Cl. .................................................. 364/200
[58] Field of Search ... 364/200 MS File, 900 MS File, 364/736

[56] References Cited

U.S. PATENT DOCUMENTS 4,490,786 12/1984 Nakatani .............................. 364/200
4,594,682 6/1986 Drimak ................................ 364/200

Primary Examiner—Raulfe B. Zache
Attorney, Agent, or Firm—Antonelli, Terry & Wands

[57] ABSTRACT

A vector to be processed consisting of a plurality of partial vectors each having a variable number of vector elements and a key vector consisting of a fixed number of vector elements are vector-processed while the vector elements of those vectors are sequentially read out. A vector processor has a punctuation detection circuit for detecting a punctuation between the partial vectors in the vector to be processed. The reading of the key vector is restored to the reading of the start vector element in accordance with the detection signal from the punctuation detection circuit.

31 Claims, 15 Drawing Figures

FIG. 3 COMPARISON OF VARIABLE LENGTH CHARACTER STRING

FIG. 8

| ITEM NO. | | INPUT | | | | | | OUTPUT | | | | | |
|---|---|---|---|---|---|---|---|---|---|---|---|---|---|
| | | LCMP | TCMP | KCMP | MCMP | IND | DCMP | NWDRD | RDTK | NCH ST | RES ST | RSEND | CONTENT |
| 1 | | ≤ | ≤ | > | ≤ | ≠ | = | O | — | — | O | × | CONTINUE TO COMPARE |
| 2 | | ≤ | ≤ | = | ≤ | = | = | — | — | O | — | — | EQUAL |
| 3 | a | ≤ | ≤ | > | ≤ | = | × | — | — | O | — | O | NOT EQUAL |
| | b | ≤ | ≤ | = | ≤ | ≠ | × | — | — | O | — | O | |
| | c | ≤ | ≤ | × | ≤ | × | ≠ | — | — | O | — | O | |
| 4 | a | ∨ | × | × | × | × | × | O | O | O | × | × | END |
| | b | × | ∨ | × | × | × | × | O | O | O | × | × | |
| | c | × | × | × | ∨ | × | × | O | O | O | × | × | |

FIG. 9
FIG. 10
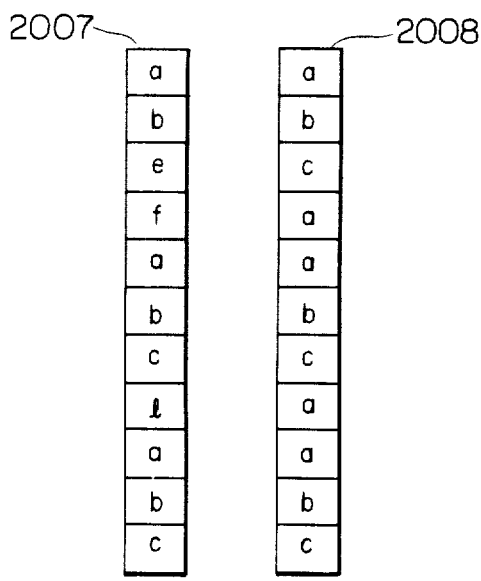
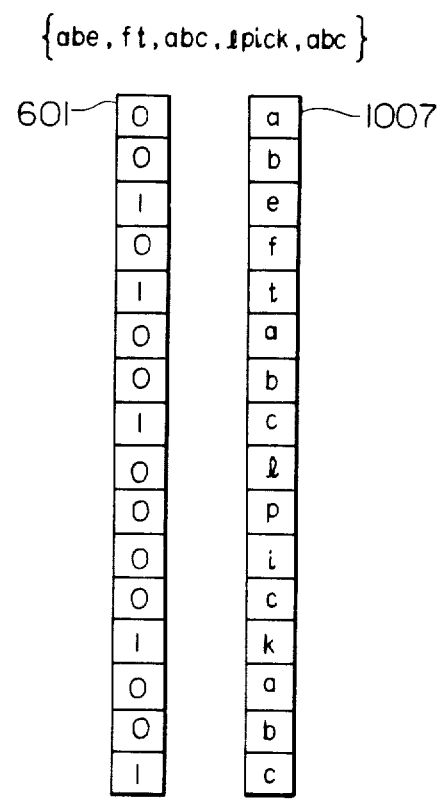

VECTOR PROCESSOR

BACKGROUND OF THE INVENTION

The present invention relates to a vector processor, and more particularly to a vector processor suitable for symbol processing such as character string data processing.

With recent development of a super computer, effectiveness of vector processing has been widely known. In an application field of the vector processing, not only numeric calculation application but also other applications such as symbol processing have been discussed. However, many difficulties arise when a vector processor is to be applied to the symbol processing. A particular problem is processing of variable length data (character string and list) which are frequently seen in the symbol processing. In the following, search processing of the character string is discussed to explain problems involved therein.

In the character string retrieval for example, all words having coincidence with a key word "abc" are retrieved from a string of a plurality of words ["abe", "ft", "abc", "lpik", "abc"].

When the character string search is to be carried out by a prior art vector processor as shown in Japanese patent Application Unexamined Publn. No. 53-87640, a system shown in FIG. 1 may be considered. A vector 1004 having an element length which is long enough to store a longest word (i.e. "lpick" in the word string is prepared and the words are stored in respective elements, and the elements in the vector 1004 are sequentially compared with a key word 1003 by a vector command to produce a compare result vector 1005.

However, the system shown in FIG. 1 has the following two problems. When the lengths of words greatly differ, a memory area for storing the word string is wasted. In the prior art vector processor, an appear limit of the length of the vector elements which can be processed is fixed (usually 8 bytes), and a word string which includes a word longer than the upper limit is not processed.

SUMMARY OF THE INVENTION

It is an object of the present invention to provide a vector processor which can process a variable length data string at a high speed with an effective use of a memory.

In order to achieve the above object, there is provided a vector processor comprising:

vector storage means for holding at least the first vector comprised of plural vector elements and the second vector comprised of plural vector elements for indicating punctuation positions which divide said first vector into plural partial vectors;

first and second read means respectively for sequentially reading the vector elements of the first and second vectors;

detect means connected to said second read means for providing a partial vector end signal representing that a vector element read out by said first read means is the last vector element of one of the partial vectors, depending upon the vector elements read out by said second read means;

operation means connected to said storage means for performing an operation on vector elements sequentially read out from said storage means and for sequentially providing outputs corresponding to the results of the operation;

control means connected to respond to said signal from said detect means and said outputs from said operation means for sequentially providing vector elements each representing a result of the operation on vector elements belonging to a partial vector.

BRIEF DESCRIPTION OF THE DRAWINGS

FIG. 3 illustrates softwar processing of the procedure shown in FIG. 2, FIG. 8 is a truth table showing an operation of a next operation decision logic shown in FIG. 6, FIG. 9 illustrates an operation of the operand control circuit shown in FIG. 6, FIG. 10 shows another example of punctuation information.

DESCRIPTION OF THE PREFERRED EMBODIMENTS

Figure 2:
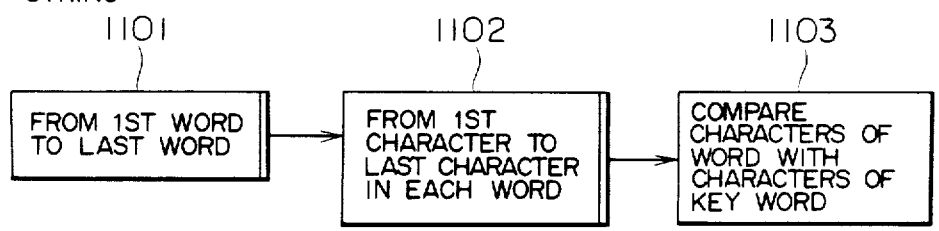
FIG. 2 shows a procedure of processing of a vector processor of the present invention.

In order to resolve the above problems, a vector processing system as shown in FIG. 2 is implemented by software. A vector 1007 to be operated which comprises component characters of words in the word string 1002 and a vector 1006 which contains lengths of the word (i.e. partial vectors) are prepared. The vector 1007 is compared with a vector 1008 which contains characters of a key word by a software for each word to produce a compare result 1009. For example, since a first element of the vector 1006 is "3", the vector 1007 is compared with first three vector elements of the vector 1008. Since the third characters are not equal, "0" is stored in the vector 1009. In this manner, search is made.

In the system shown in FIG. 2, the memory area is not wasted and the vector element lengths may be fixed. However, when this system is used with the prior art vector processor, efficient processing is hard to attain. A reason therefor is explained with reference t FIG. 3.

FIG. 3 is a PAD (program analysis diagram) representation of a procedure of the character string search system shown in FIG. 2. As seen from the PAD diagram, the character string search processing by the software shown in FIG. 2 comprises an inner loop 1102 for comparing the characters in the words and an outer loop 1101 for processing the words in the word string. Since the number of characters of the word is variable from word to word, the number of times of looping for the inner loop 1102 differs from time to time.

On the other hand, a vector instruction in the prior art vector processor sets up the vector length of the vector to be processed at the start of the instructon execution and loops the processing by the number of times corresponding to the vector length to process the vector. Accordingly, in the prior art vector processor, the inner loop 1002 is processed by the vector instruction and the vector length is set again by a scalar instruction at the end of processing of each word. However, the inner loop has a small number of times of looping or a small vector length. As is well known since the vector instruction takes a long time in starting and ending, a sufficient performance is not attained when the vector length is short. Accordingly, if the vector instruction is applied to the inner loop 1002 only, the performance is not significantly improved as a whole.

Figure 1:
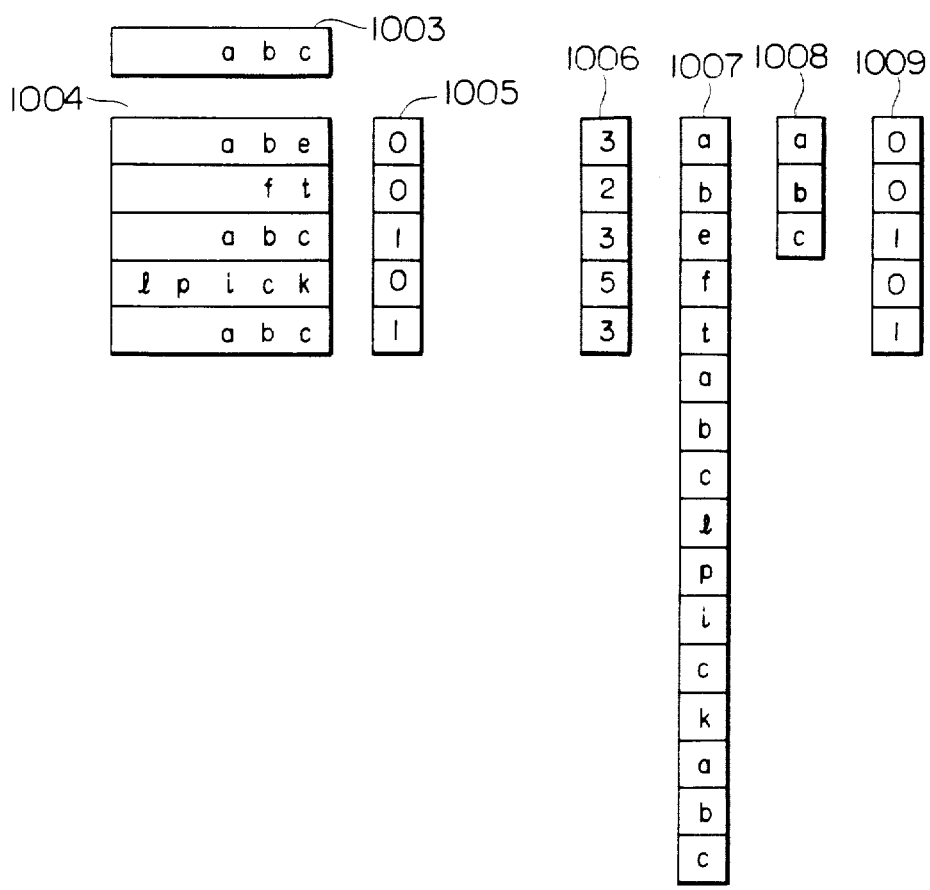
FIG. 1 shows a prior art system for vector processing a variable length data.

Thus, when the prior art vector processor is applied to the symbol processing such as character string searching, the system shown in FIG. 1 causes the waste in the memory area and restriction on the word length although it permits a long vector length and a high processing speed while the system shown in FIG. 2 causes a short vector length and a low performance.

Configuration and operation of one embodiment of the present invention are explained for the character string search.

Figure 4:
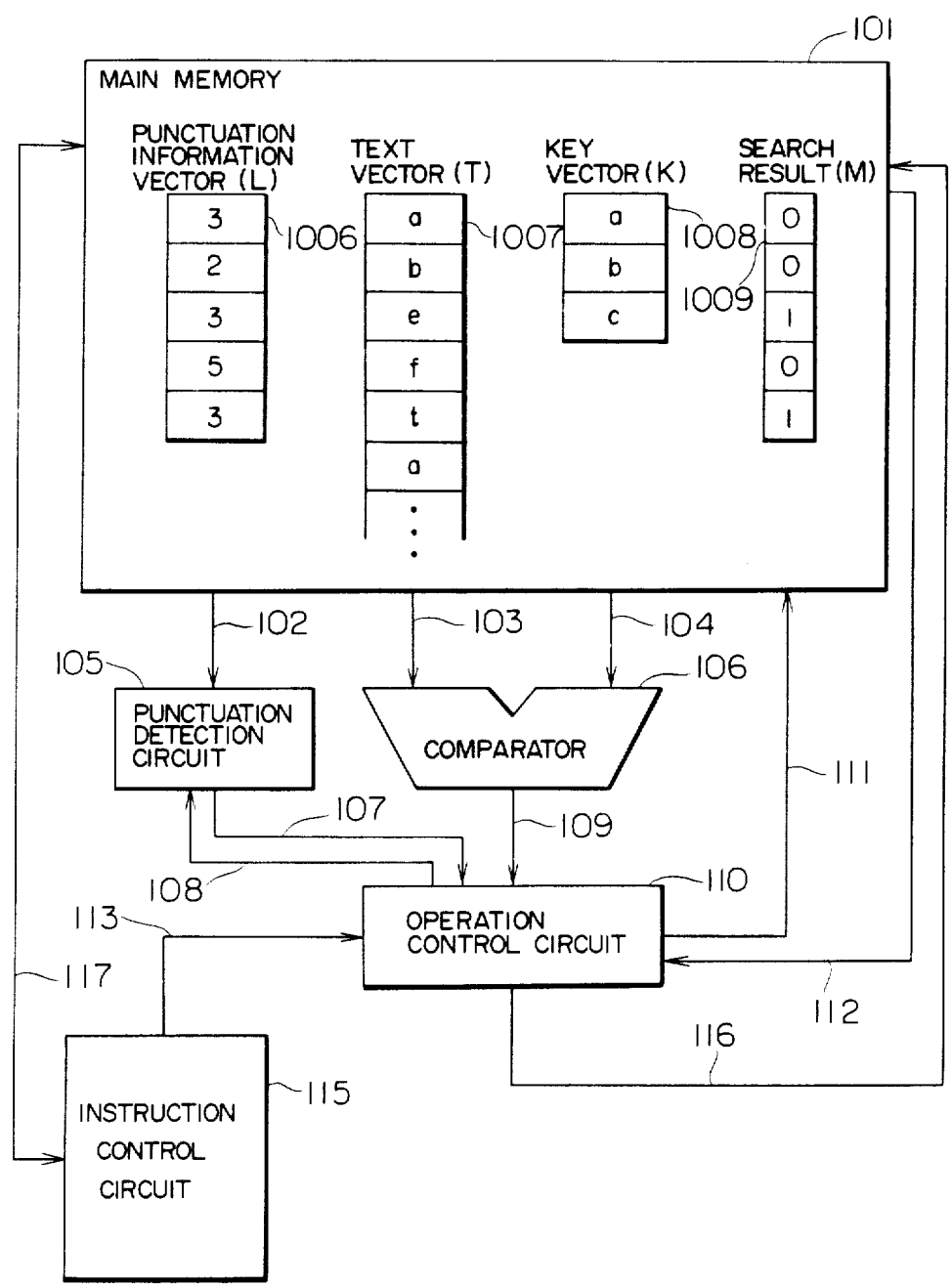
FIG. 4 shows a configuration of one embodiment of the present invention.

FIG. 4 shows the configuration of a vector processor of the present invention. Referring to FIG. 4, the confuguration and operation of the present embodiment as well as differences from those of the prior art system are explained.

Stored in a main memory 101 are a text vector 1007 which includes an array of component characters of a word string, a key vector 1008 which includes an array of component characters of a key word, and a punctuation information vector 1006 which indicates lengths of the words (i.e. partial vectors).

When an instruction control circuit 115 decodes a character string search instruction read from the main memory 101, it instructs to an operation control circuit 110 to start the character string search processing. The operation control circuit 110 sequentially reads out the elements of the vector 1007 and the elements of the key vector 1008 from the main memory 101. Those vector elements are sent to a comparator 106 for comparison. In parallel to the comparison, the elements of the punctuation information vector 1006 are sent to a punctuation detection circuit 105, which determines whether the process is now in a punctuation in the word string, that is, whether the vector element under comparison in the comparator 106 is the last component character of the word. A compare result 109 and a punctuation detection result 107 are sent to the operation control circuit 110, which examines a status of the character string based on the compare result and the detection result, and when equal/unequal condition of the word and the key word is determined, it writes "1" or "0" at the corresponding element in the search result vector 1009 and determines a next operation to be executed.

For example, the first element "a" of the text vector 1007 and the first element "a" of the key vector 1008 are equal by the comparison by the comparator 106 and they are not in the punctuation areas of the word strings as is detected by the punctuation detection circuit 105. Thus, the operation control circuit 110 instructs to read and compare the second vector elements. The second characters are both "b" and they are equal. Then, the characters "e" and "c" are compared. The compare result is unequal and the punctuation detection circuit 105 indicates that "e" is the last character in the word. Accordingly, the control circuit 110 writes a data "0" at the first element of the search result vector 1009 through a signal line 116 to indicate that the first word is not equal to the key word and initiates the comparison of the next word and the key word. The writing of the result and the reading of the next element are parallelly carried out in a pipeline fashion.

In this manner, by virtue of the punctuation detection circuit 105 and the operation control circuit 106, the processing is not interrupted in the punctuation area of the word string and the pipeline processing is carried out.

Since the prior art vector processor does not have means for detecting the punctuation area in the vector, one character string search instruction can compare only one word with the key word. That is, it can process only the inner loop of FIG. 3. Accordingly, in the above example, fine search instructions having the vector lengths "3", "2", "3", "5" and "3" of the text vector must be executed. In the present embodiment, only one search instruction having the vector length of $3+2+3+5+3=16$ of the text vector need be executed. thus, the entire double loop of FIG. 3 can be processed as one operand. As a result, the overhead due to the start/termination of the operation and the overhead due to the interruption of the pipeline processing of the vector are smaller than those in the prior art system and a high speed operation is assured.

The configuration and operation of the present invnetion have been briefly described above. Now, details of the configuration and operation of the present embodiment are explained.

Figure 5:
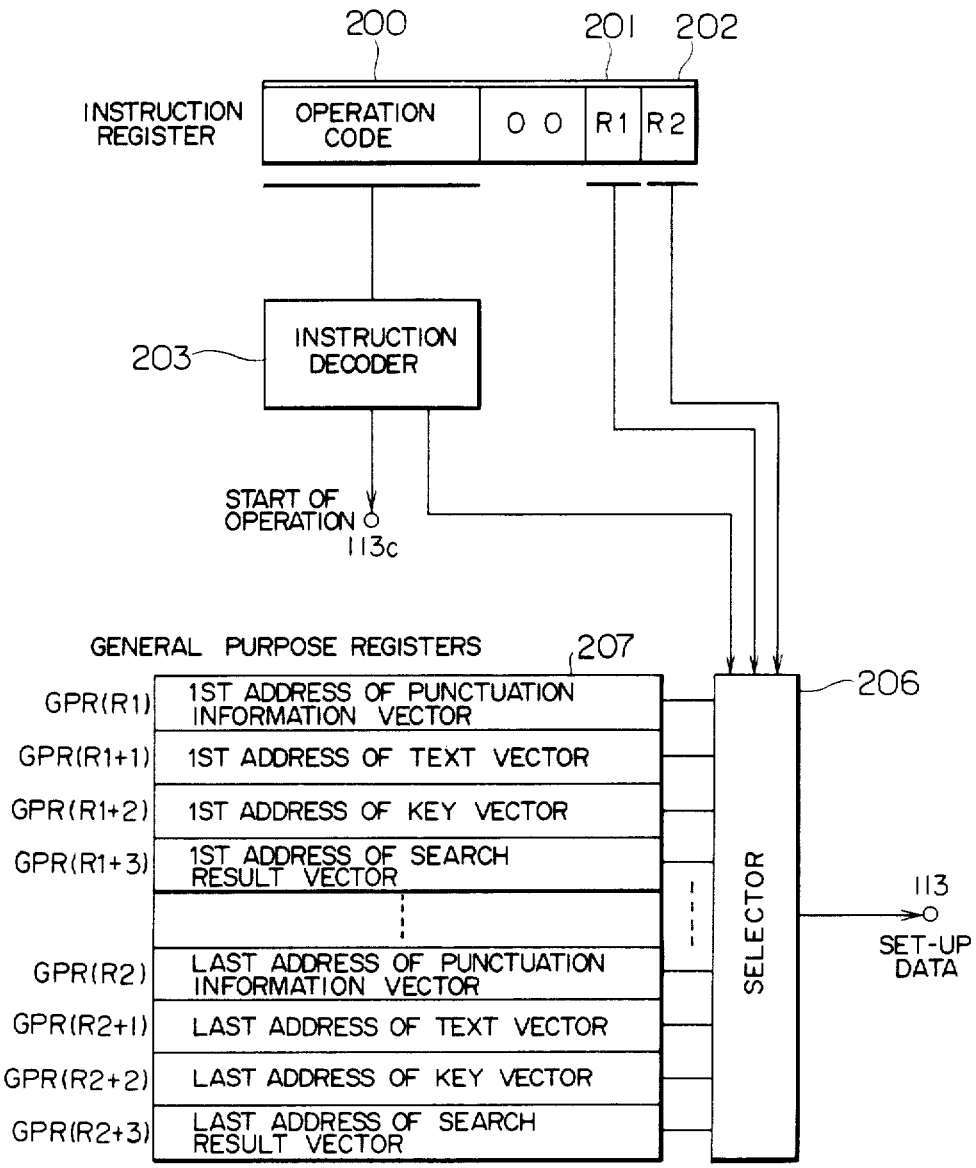
FIG. 5 shows a configuration of an instruction control circuit shown in FIG. 4.

FIG. 5 shows a configuration of the main part of the instruction control circuit 115 shown in FIG. 4. As the character string search instruction is set to the instruction register 200 and the operation code thereof is decoded by the instruction decoder 203, contents of general purpose registers GPR(R1) to GPR(R1+3) and GPR(R2) to GPR(R2+3), respectively designated by R1 field and R2 field of the instruction within the general register group 207 are sent to the operation control circuit 110 as a set-up data, through a selector 206 and a data line 113. As shown in FIG. 5, the four registers designated by the R1 field store therein first element addresses of the punctuation information vector 1006, text vector 1007, key vector 1008 and search result vector 1009, respectively. The four registers designated by the R2 field store therein the last element addresses of those vectors. As the set-up data are sent out, a start of operation signal 113c is sent from the instruction decoder to the operation control circuit 110.

Figure 6:
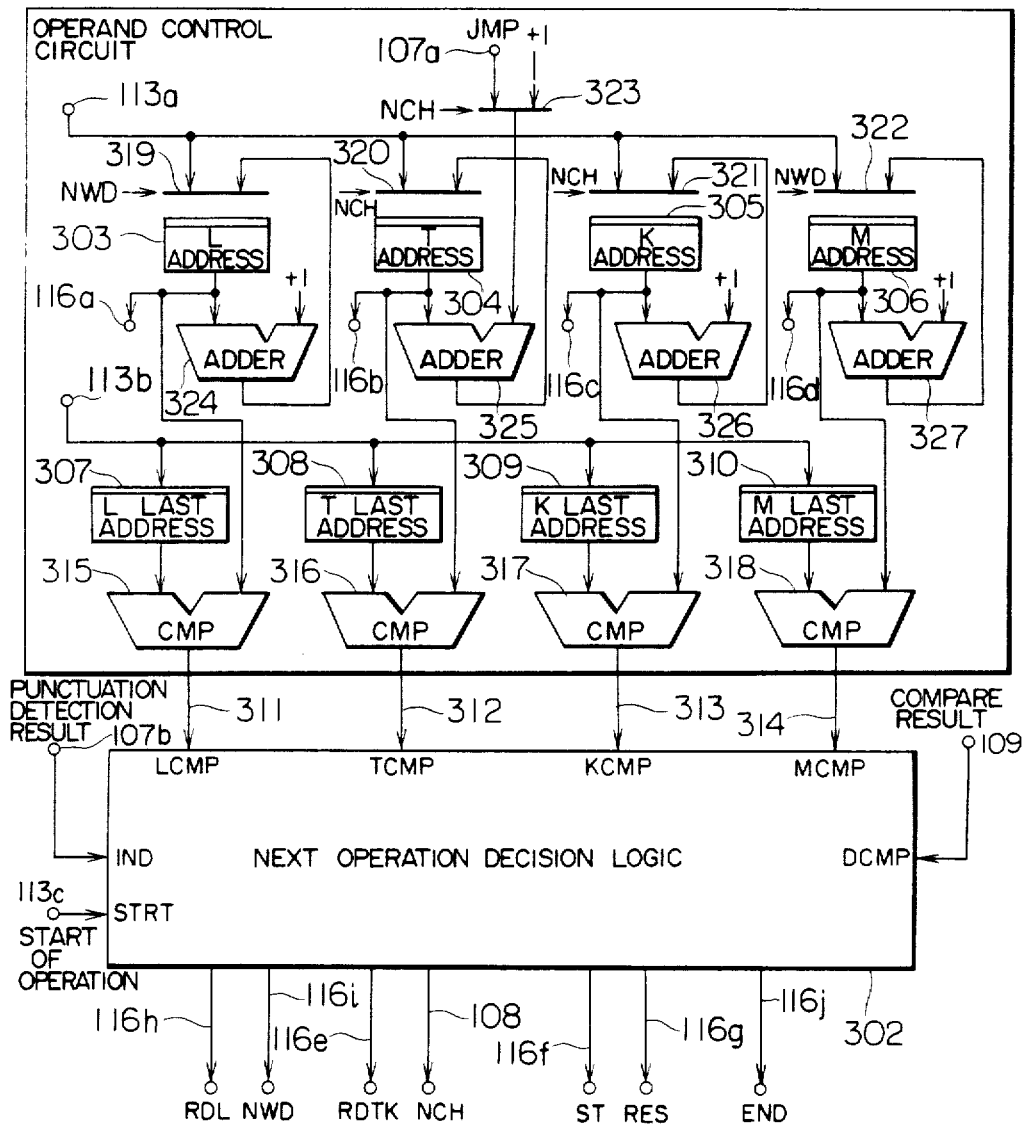
FIG. 6 shows a configuration of an operation control circuit shown in FIG. 4.

FIG. 6 shows a configuration of the operation control circuit 110 shown in FIG. 4. The operation control circuit 110 comprises two major sections, an operand control circuit 301 and a next operation decision logic 302. The operand control circuit manages the element addresses of the vector operands 1006-1009. The next operation decision logic 302 determines the next operation based on the status of the addresses of the vector operands (whether they are last addresses or not), the punctuation detection result 107b and the compare result 109 of the text and the key word, and sends the next operation instruction to the respective circuits.

The instruction control circuit 115 sets up the start addresses of the vector operands stored in the four general purpose registers designated by the R1 field of the instruction 200 into address registers 303-306 through a data line 113a, and sets up the end addresses of the vector operands stored in the four general purpose registers designated by the R2 field into registers 307-310 through a data line 113b.

After the setting-up of the operation control circuit 110, the instruction control circuit 115 starts the character string search operation by a control signal STRT 113c. The next operation decision logic 302 reads out the vector elements in accordance with the contents of the registers 303-305 which store therein the element addresses of the input vector operands 106-1008. Of the read data, the elements of the punctuation information vector 1006 are sent to the punctuation detection circuit 105 through a data line 102, and the elements of the text vector 1007 and the key vector 1008 are sent to the comparator 106 through data lines 103 and 104, respectively.

Figure 7:
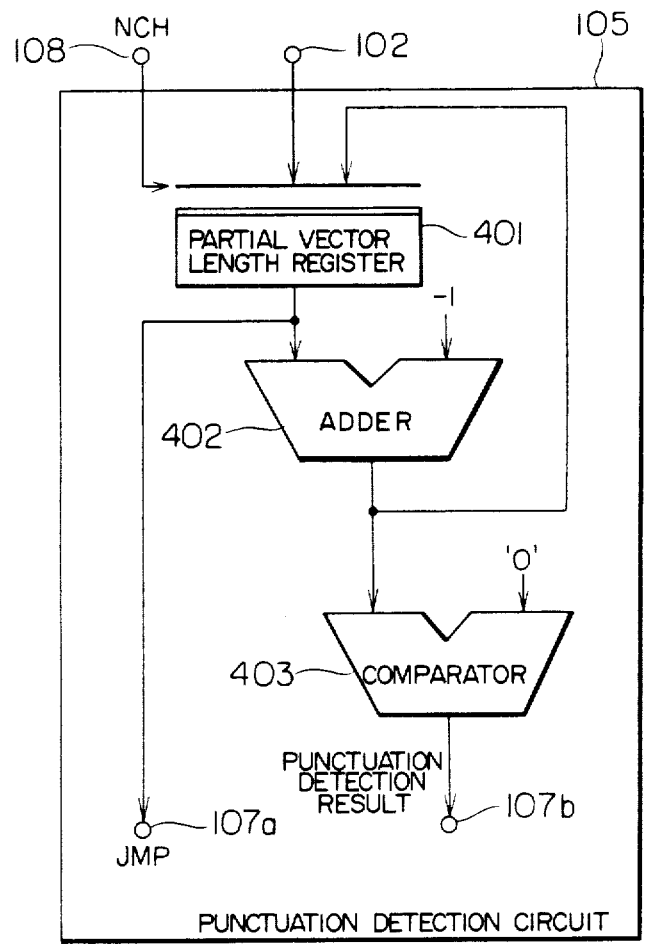
FIG. 7 shows a configuration of a punctuation detection circuit shown in FIG. 4.

FIG. 7 shows a configuration of the punctuation detection circuit 105 shown in FIG. 4. The elements of the punctuation information vector 1006 read from the data line 102 are set into a partial vector length register 401. The punctuation detection circuit decrements the content of the partial vector length register 401 by one through an adder 402 each time the comparison of new characters of the word and the key word is carried out, and when the content reaches "0", that is, when the last characters of the words are compared, it is detected by a comparator 403 and the punctuation detection signal IND 107b is sent to the next operation decision logic 302 of the operation control circuit 110.

A compare result DCMP of the comparator 106 for the characters of the word and the characters of the key word is also sent to the next operation decision logic 302 through a compare result signal line 109.

In addition to the above two control signals IND and DCMP, signals LCMP, TCMP, KCMP and MCMP 311-314 which indicate whether the processing is for the last elments of the punctuation information vector, text vector, key vector and search result vector, respectively, are supplied to the next operation decision logic 302. Whether the processing is for the last element or not is determined by comparing the contents of the element address registers 303-306 with the contents of the last address registers 307-310, by the comparators 315-318, respectively.

FIG. 8 is a truth table for illustrating the operation of the next operation decision logic 302 shown in FIG. 6. The operation of the next operation decision logic 302 is now explained with reference to FIG. 8 and the detail of the operation of the vector processor of the present invention is also explained.

In an item No. 1 in FIG. 8, the comparison of the intermediate characters of the word and key word is continued. The contents of the vector element address registers 303-306 do not exceed the contents of the last address registers 307-310. (LCMP, TCMP, KCMP and MCMP are "≧"). For the key word, the processing is not for the last character. That is, the content of the key vector element address register 305 is smaller than the content of thekey vector last address register (KCMP is ">"). In the item No. 1 case, the detection result 107b of the punctuation detection circuit 105 indicates that the processing is not for the punctuation area of the word string (IND is "≠") and the compare result 109 of the comparator 106 for the character of the word and the character of the key word indicates the coincidence of those characters (DCMP is "="). In this case the next characters of the word and the key word, that is, the next elements of the text vector and the key vector are read out and compared. The next operation decision logic 302 sets a read request signal RDTK 116e for the next elements of the text vector and the key vector to "1" and sends it to the main memory 101, and sets a signal NCH 108 to "1" to proceed the comparison to the next character and sends it to the operand control circuit 301 and the punctuation detection circuit 105.

As the operand control circuit 301 receives the NCH signal, it increments the text vector element address register 304 and the key vector element address register 305 by one, respectively. The incrementation is carried out by the address 325 and 326. The selectors 323, 320 and 321 select the right-hand signals if the NCH signal 108 is "1" so that the incremented contents are loaded to the registers 304 and 305. (In the present embodiment, the selectors select the left-hand signals if the select signal is "0", and select the right-hand signals if the select signal is "1".)

When the punctuation detection signal 105 receives the NCH signal 108, it decrements the content of the partial vector length register 401 by one. In FIG. 8, "X" indicates an arbitrary value.

The operation in the item No. 1 in the truth table of FIG. 8 has thus been described. It is, for example, the processing for the first element of the vector. Specifically, the first elements of the text vector 1007 and the key vector 1008 are both "a" and they are equal, and the first element of the punctuation information vector 1006 is "3" and does not indicate the punctuation area. Accordingly, the condition of the item No. 1 is met and the NCH signal assumes "1". As a result, the addresses of the text vector and the key vector are incremented by one, respectively, by the NCH signal and the second elements are read and compared. The content of the partial vector length register 401 is decremented by one to "2" and the next operation decision logic 302 designates the next operation.

The item No. 2 case is now explained. In this case, the word and the key word are completely equal. In the input state, the contents of the registers 303, 304 and 306 which contain the vector element addresses other than the element address of the key vector do not exceed the contents of the last address registers 307, 308 and 310, respectively, (LCMP, TCMP and MCMP are "≧") and the last characters of the word and the key word are equal (DCMP is "=") when the last characters are processed. In this case, a control signal NWD is set to "1" to instruct the processing of the next words and the read request signal RDL 116b for the punctuation information vector element and the read request signal RDTK 116e for the next elements of the text vector and the key vector are sent to the main memory 101. In parallel therewith, the data signal RES 116g which indicates the search result is set to "1" and the write request signal ST (116f) is sent to the main memory 101 and the content of the RES signal is stored at the memory area designated by the search result vector element address register 306. In the item No. 2, the processing proceeds to the next word. This is explained below.

The content of the data signal JMP 107a from the punctuation detection circuit 105 is loaded to the text vector address register 304 through the selector 323, adder 325 and selector 320. (Note that the NCH signal is "0".) The signal JMP represents the content of the partial vector length register 401. At the beginning of the processing of the word, the length of the word is loaded to the partial vector length register 401 and it is decremented by one each time one character is compared as described in the item No. 1. Accordingly, the content of the signal JMP indicates the number of unprocessed characters in the word. Accordingly, by ading the signal JMP to the address register 304, the address register 304 indicates the start address of the next word.

The start element address of the key vector is again loaded to the element address register 305 of the key vector 1008 through the selector 321 and the dta line 113a. Thus, the address register 305 again points the start address of the key word.

On the other hand, the element address register 303 of the punctuation information vector 1006 is incremented by one in response to the signal NWD to designate the next element and the next element is read and loaded to the partial vector length register of the punctuation detection circuit 105. The element address of the search result vector 1009 is also incremented in response to the signal NWD to prepare for the storing of the next search result.

Thus, the movement to the next word is completed. The above processings (register settings) are carried out in parallel.

The item No. 3 case of the truth table of FIG. 8 is explained below. In this case, the word and the key word are not equal. The unequal condition is detected in one of the following three cases:

(a) The key word length is longer than the word length,
(b) The word length is longer than the key word length, and
(c) The corresponding characters of the word and the key word are not equal.

The above cases (a) to (c) correspond to a-c in the item No. 3 of FIG. 8. In the item No. 3a, the processing is not for the last character of the key word (KCMP is ">") but the processing is for the last character of the word (IND is "="). In the item No. 3b, the processing is for the last character of the key word (KCMP is "=") but the procesing is not for the punctuation area of the word (IND is "="). In the item No. 3c, the corresponding characters are not equal (DCMP is "=") independently from the positions in the word and the key word. In those cases, the search result signal RES 116g is set to "0" and it is sent to the main memory 101 together with the write request signal ST (116f), and the content of the RES signal is stored at the memory area designated by the element address register 306 of the search result vector 1009. In parallel with the write operation, the NWD signal and the RD signal rea set to "1" to proceed to the next word processing as is done in the item No. 2.

In the item No. 4 case, the unprocessed element of one of the vectors has been exhausted. That is, the content of at least one of the registers 303, 304 and 306 which hold the vector element addresses exceeds the content of the corresponding last address register 307, 308 or 310 (at least one of LCM, TCMP and MCMP is "<"). In this case, the character string search operation is terminated and the instruction control circuit 115 starts to decode the next instruction in response to the END signal 116j.

By the operation of the operation control circuit 110, it appears as if the vectors 2007 and 2008 shown in FIG. 9 were sequentially applied element by element to the input lines 103 an 104 of the comparator 106, respectively.

The character string search operation by the vector processor of the present invention has thus been described primarily for the operation of the next operation decision logic. In the present embodiment, the vector (text vector 1007) having a combination of a plurality of words may be used as the vector operand under the control by the punctuation detection circuit and the next operation decision logic which reflects the detection result. Accordingly, the vector of a longer vector length can be processed than the prior art vector processor can.

In the embodiments shown in FIGS. 4-8, the characters of the word and thekey word are sequentially compared and the unequal condition is detected if the characters of one of the words have been exhausted. Alternatively, the lengths of the word and the key word may be compared first and, if they arenot equal, the next word may be immediately processed.

In FIG. 4, the punctuation information vector contains the word lengths. Other information may be used. For example, each vector element can be address of the last element of a corresponding partial vector of the text vector. Furthermore, the embodiment can be modified so that each vector element of the punctuation vector element represents an address of the first element of a partial vector next to a corresponding partial vector element. These modifications should be regarded as being within the scope of the present invention.

These kinds of punctuation information vectors including the punctuation vector 1006 used in the embodiments are desirable in that the vector elements of these vectors can be used in order the provide the address of the first vector elements of the next partial vectors which can be used when a jump to the next partial vectors occurs, as was explained in the embodiments.

Furthermore, these kinds of punctuation vectors are desirable, because a storage area required for these vectors is smaller than the storage area required for the text vector 1007.

Other kinds of punctuation information vectors can be used, however, wherein the number of vector elements corresponding to a partial vector is the same as the number of vector elements of the corresponding partial vector. For example, the vector elements corresponding to a partial vector can have the same value of 1 or 0 and the value is determined so that the value is different from the value of vector elements corresponding to a partial vector which precedes the corresponding partial vector. FIG. 10 shows another example of the punctuation information. A vector 601 in FIG. 10 shows the punctuation areas in the text vector by setting the elements corresponding to the last characters of the words to "1" and setting other elements to "0". In order to use the vector 601 as the punctuation information, the elements of the vector 601 may be directly used as the punctuation detection result (IND signal 107b). Accordingly, the construction of the punctuation detection circuit 105 is simple but it is difficult to obtain the value corresponding to the JMP signal 107a when the processing proceeds to the next word (because the next "1" must be searched on the vector 601).

In the embodiment shown in FIG. 4 (first embodiment), the character string search instruction is fetched from the main memory 101 and the result is written into themain memory 101. The prior art vector processor for this instruction type may be Hitachi M-280H IAP. On the other hand, another type of vector processor has a vector register to which vector operation is carried out. This type of vector processor may be Hitachi S-810. The present invention is also applicable to the vector processor having the vector register such as S-810.

One embodiment (second embodiment) in which the present invention is applied to the vector processor having the vector register is now explained for its configuration and operation.

Figure 11:
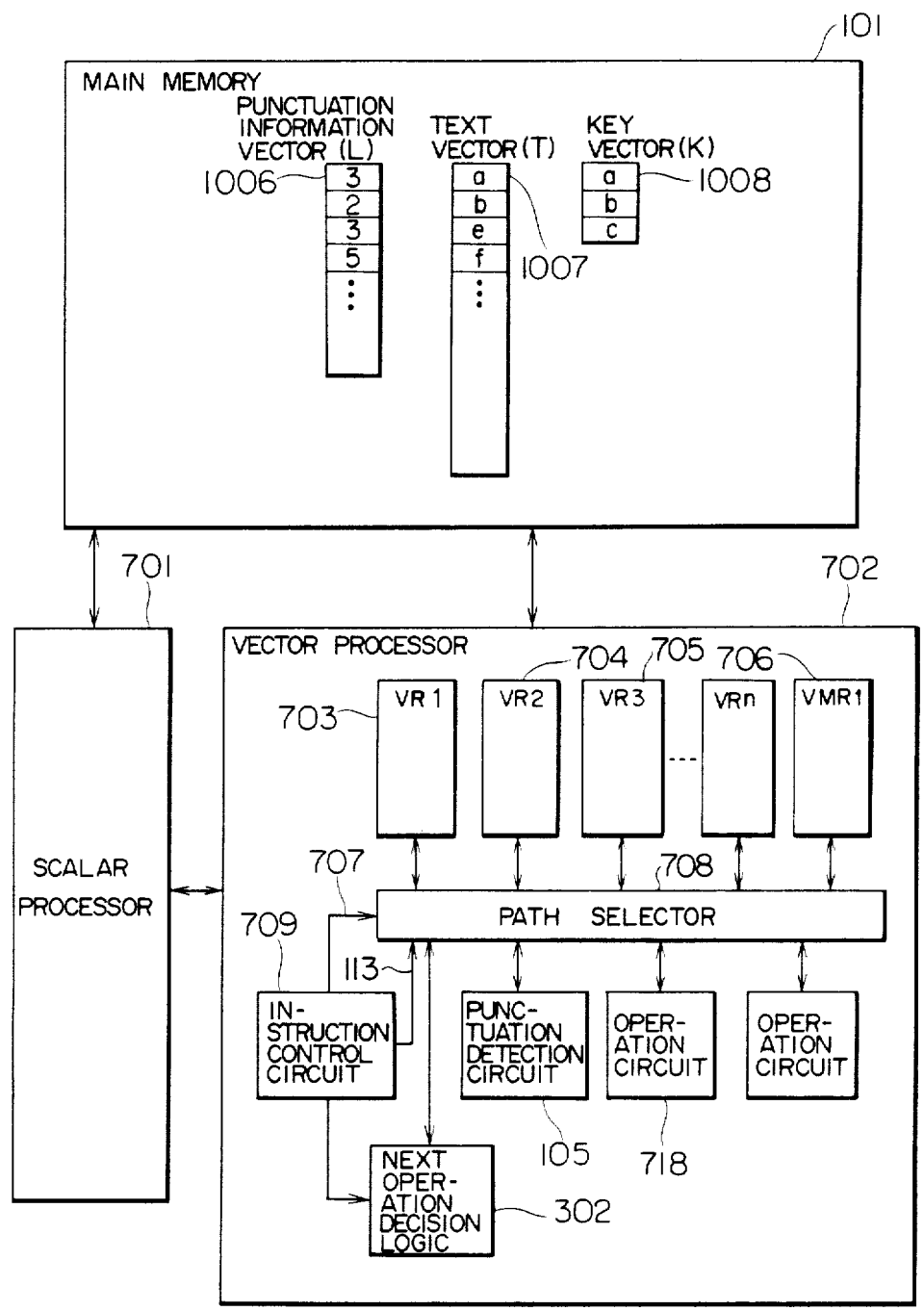
FIG. 11 shows a configuration of an embodiment in which the present invention is applied to a vector processor having a vector register.

FIG. 11 shows a configuration of the second embodiment in which the present invention is applied to the vector processor having the vector register.

The differences from the first embodiment as well as the configuration and operation of the second embodiment in the character string search instruction 810 are explained. The details of the configurations of the instruction control circuit 709 and the path selector 708 ca be easily obtained by modifying those described in Japanese Patent Unexamined Publn. No. 58-114274, its corresponding U.S. patent application Ser. No. 453,094 or its corresponding West Germany patent application No. 32 48215.9 based upon the explanation below and the explanation of the instruction control circuit 115 of FIG. 5. These patent applications are incorporated herein by reference. The instruction control circuit 709 needs to include general registers for storing vector lengths of the punctuation information vector, the text vector, the key vector and the search result vector, in order to provide these vector lengths as set data respectively to the vector registers VR1, VR2, VR3 and the mask vector registers MVR1, instead of the set data shown in FIG. 5.

When the instruction control circuit 709 decodes the instruction 810, the instruction control circuit 709 instructs to a path selector 708 through a signal line 707 to couple the following circuits, if the decoded instruction designates the vector registers VR1 to VR3 and VMR1, and the operation circuit 718. The connection will be explained in more detail later on.

(1) A vector register VR1 703 and the punctuation detection circuit 105.

(2) A vector register VR2 704 and the operation circuit 718.

(3) A vector register VR3 705 and the operation circuit 718.

(4) The next operation decision logic 302, and the punctuation detection circuit 105 and the operation circuit 718.

(5) The next operation decision logic 302 and the vector registers VR1, VR2, VR3 and VMR1.

(6) The instruction control circuit 707 and the vector registers VR1 to VR3 and VMR1.

At the end of the connection, the instruction control circuit 709 instructs to the next operation decision logic 302 to start the operation.

When the next operation decision logic 302 receives the instruction to start the operation, it determines the next operation based on the number of the proposed elements addresses of the vectors, the compare result and the punctuation detection result and sends the instruction on the next operation to the respective circuit so that the processing is proceeded. The circuits in the second embodiment, the connection thereof and the operation are now explained.

the configurations of the vector registers 703–706 are first explained.

Figure 12:
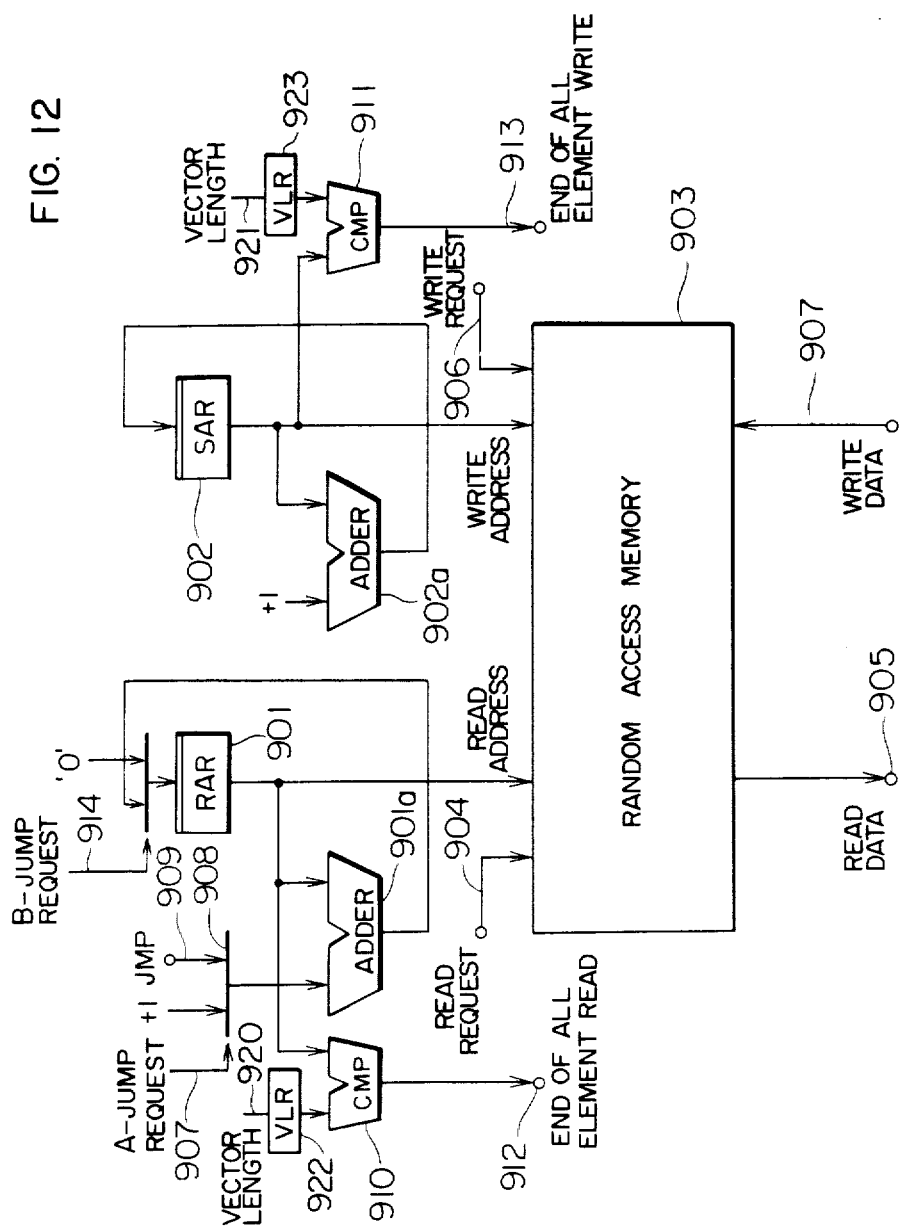
FIG. 12 shows a configuration of the vector register shown in FIG. 11, and FIGS. 13a, 13b and 13c show a scalar instruction string and a vector instruction string used to search a character string in the embodiment shown in FIG. 11.

All vector registers are of the same configuration except that the mask vector register VMR1 stores vector elements each with one bit width. FIG. 12 shows the configuration of the vector register. If comprises a random access memory 903, a read address register RAR 901, a write address register SAR 902 and address adders 901a and 902a. The address registers RAR and SAR provide a sequential number of a vector element to be accessed. The random access memory 903 stores the vector elements therein. When the vector register receives the read request 904, it reads out the data designated by the read address register 901 from the momory 903 and sends it to the path selector 708 through the data line 905. When it receives the write request 906, it writes the data sent from the path selector 708 through the data line 907 into the memory area designated by the write address register 902. At the end of the send or write operation, the coresponding address register 901 or 902 is incremented by one. For the read address register 901, if the A-jump request 907 is "1", it is not incremented by one but the content of the JMP signal 909 from the path selector 708 is added thereto. When the B-jump request 915 is "1", the register 901 is reset to "0".

Whether or not the contents of the address registers 901 and 902 have reached the vector lengths held by the registers 992 and 923, respectively is checked by the comparators 910 and 911, respectively, and the result is sent to the path selector 708 as an end of read signal 912 or an end of write signal 913. The address register RAR 901, address adder 901a and comparator 910; and the write address register SAR 902, address adder 902a and comparator 911 of the vector register correspond to the operand control circuit 301 (FIG. 6) in the first embodiment of FIG. 4.

The configurations of the vector registers 703–706 have thus been described. The connection between circuit elements in FIG. 11 are now explained.

End of all element read signals 912 from the vector registers 803–806 are supplied to LCMP 311, TCMP 312, KCMP 313 and MCMP 314 of the next operation decision logic through the path selector 708.

The data read from the vector register 703 is applied to the signal line 102 of the punctuation detection circuit 105 through the path selector 708. The punctuation detection result 107b is sent to IND 107b of the next operation decision logic 302 through the pass selector 708.

The data read from the vector registers 704 and 705 are sent to the operation circuit 718 through the path selector 708 for comparison, and the compare result is supplied to DCMP 109 of the next operation decision logic through the path selector 708.

On the other hand, the read request signal RDL 116h for the vector L and the jump instruction signal NWD 116i from the next operation decision logic 302 are supplied to the vector register 703 through the path selector 708 and applied to the signal lines 904, 907, respectively. The NWD signal is also sent to the vector register 705 and applied to the signal lines 914.

The read request signal RDTK 116e for the text vector T and the key vector K from the next operation decision logic 302 is sent to the vector registers 704 and 705 as the read request signal, through the path selector 708.

The write request signal 116f from the next operation decision logic 302 and the write data 116g are sent to the vector register 706 and applied to the signal lines 906 and 907, respectively.

The NCH signal 108 for instructing the comparison of the next characters is also sent to the punctuation detection circuit 105 through the path selector 708. The JMP signal 107a from the punctuation detection circuit 105 is applied to the JMP input 909 of the vector register 703. "0"'s are applied to all control inputs to the unconnected vector registers to suppress unnecessary operation. The respective vector lengths of the punctuation information vector, the text vector, the key vector and the search result vector are respectively connected to the three read vector length inputs 920 of the vector registers VR1 to VR3 to be stored in the read vector length registers 922 thereof and to the write vector length input 921 of the mask vector register MVR1 to be stored in the write vector length register 923 thereof.

As is clear from the explanation above, the path selector 708 can connect an output of any selected operation unit to the input of the next operation decision logic 302.

Under the configuration and connection described above, the same operation as that of the first embodiment is attained. The operation is exactly same as that of the first embodiment except that the vector elements are not read from nor written into the main memory 101 but read from and written into the vector registers 703–706.

In the second embodiment, the configuration of the main memory 101 and the input vector operands 1006–1008 stored therein are identical to those of the first embodiment. The punctuation detection circuit 105 and the next operation decision logic 302 are also of the same configurations as those of the first embodiment. The instructions are classified into those executed in the scalar processor 701 (scalar instructions) and those executed in the vector processor 702 (vector instructions).

Figure 13:
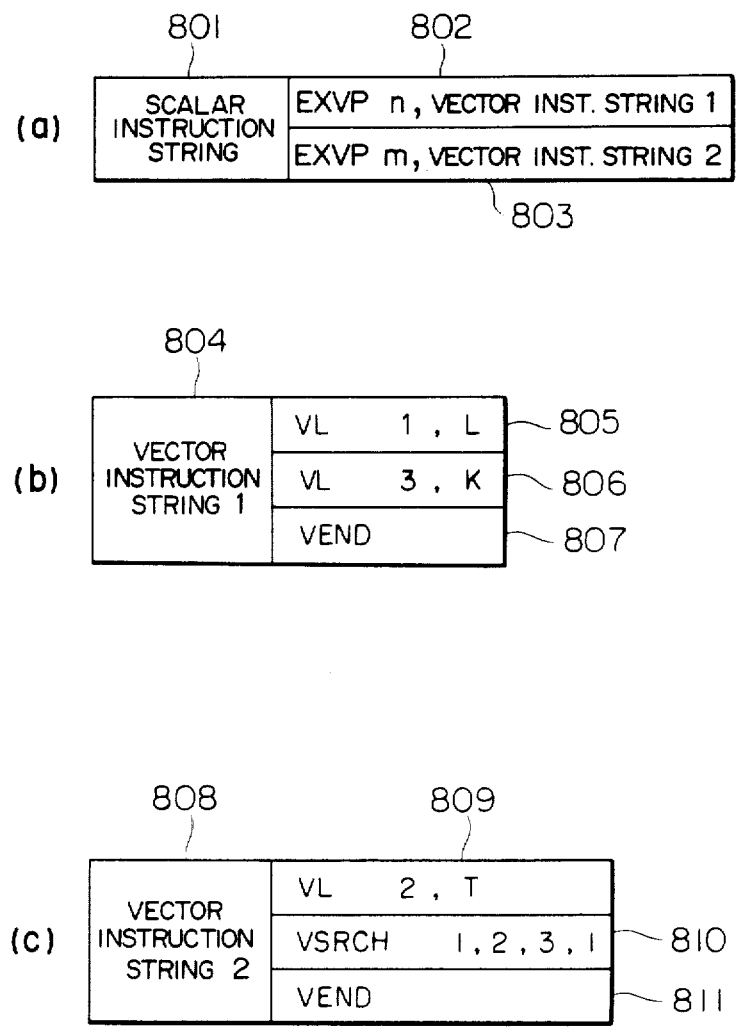

FIG. 13 shows a scalar instruction string and a vector instruction string (both stored in the main memory 101) for the character string searching.

The manner in which the instruction strings of FIG. 13 are processed in the vector processor of FIG. 12. Of the instructions shown in FIG. 13, only the instruction VSRCH 810 is new and other instructions can be executed in the prior art vector processor such as S-810.

The scalar rocessor 701 fetches the first instruction 802 of the scalar instruction string 801 shown in FIG. 13(a) from the main memory 101 and executes it. The instruction "EXVP n, vector instruction string 1" 802 instructs to the vector processor 702 to start the execution of the vector instruction string 1 with the number of elements to be processed being n and activates the vector processor 702, where n is a larger one of the number of elements in the punctuation information vector 1006 and the key vector 1007. As the instruction 802 is executed, the instruction control circuit 709 of the vector processor 702 starts to execute the vector instruction string 1 of FIG. 13(b).

The first vector instruction "VL 1, L" 805 of the vector instruction string 1 804 instructs to load the elements of the vector L (1006) to the vector register VR1 703. Similarly, the instruction 806 instructs to load the elements of the key vector K 1008 to the vector register VR2 704. When the instruction "VEND" 807 is executed, the end of the processing of the vector instruction string 1 is informed to the scalar processor 702 so that the second scalar instruction 803 is executed. The instruction "EXVP m, vector instruction string 2" 803 activates the vector processor 702 for the vector instruction string 2 of FIG. 13(c) as the instruction 802 does. The number m of the elements to be processed is the number of elements of the text vector 1007. The vector processor 702 activated by the instruction 803 first executes the first instruction "VL 2, T" 809 of the vector instruction string 2 (808). As the instruction 809 is executed, the elements of the text vector are loaded to the VR2 804. So far, the elements of the punctuation information vector 1006, text vector 1007 and key vector 1008 have been loaded to the vector registers VR1–VR3.

The instruction "VSRCH 1, 2, 3, 1" 810 is not found in the prior art vector processor and it is the instruction to operate the punctuation detection circuit 105 and the next operation decision logic 302 which are characteristic features of the present invention.

The vector instruction 810 conducts the character string search with VR1 being the punctuation information vector, VR2 being the text vector and VR3 being the key vector, and stores the result in the vector mask register MVR1.

As the instruction has been executed, it is informed to the vector instruction control circuit 709, the instruction 810 terminates and the next instruction "VEND" 811 is executed. As the execution of the vector instruction sequence 2 808 is completed, it is informed to the scalar processor. The result of the character string search is stored in the VMR1 706 and the search is terminated. When the unprocessed elements exist in the text vector 1007, the vector instruction string 2 808 is again executed from the top thereof. This may be carried out by software but the hardware control for such vector instructions has been known is a loop control. The detail of the control circuit is shown in Japanese Patent Unexamined Publn. No. 57-25068.

As described in connection with the second embodiment, the present invention is also applicable to the vector processor having the vector register such as S-810. Since the access time to the vector register is much shorter than that to the main memory, the character string search instruction 810 can be executed faster than in the first embodiment. Further, since the plurality of vector registers and the plurality of operation circuits can be coupled in any manner, the flexibility of processing is increased.

In the prior art vector processor having the vector register such as S-810, the vector processing in the character string search has to be started by the EXVP instruction for each word and the vector length is limited to the word length. In the second embodiment shown in FIG. 11, the means for detecting the punctuation in the word string is provided and the vector length can be the entire word string length. Thus, the starting overhead of the vector processor 702 is reduced.

While the character string search was illustrated to explain the operation of the embodiments, the present invention is not limited to those embodiments but it may be applied to the operation of the numeric vectors.

In accordance with the present invention, since the entire double loop can be vector-processed in the double loop processing having a variable length inner loop such as variable length character string, the vector operation for long vectors is permitted and the processing speed is increased.

Assuming that the number of times of looping for the outer loop is N and the numers of times of looping for the inner loop is $M_1, M_2, \ldots M_N$, the prior art vector processor need to execute N vector instructions with vector lengths being $M_1, M_2, \ldots M_N$ because only the inner loop is vector-processed. In the present invention, only one vector instruction having the vector length of $M_1+M_2+ \ldots +M_N$ need be executed. Accordingly, the overhead of $O\times(N-1)$ cycles is saved, where O (cycles) is the start/end overhead for the vector instruction, and the procesing speed is increased.

We claim:

1. A vector processor comprising:
    vector storage means for holding at least a first vector comprised of plural vector elements and a second vector comprised of plural vector elements each for indicating punctuation positions which divide said first vector into plural partial vectors;
    first and second read means respectively connected to said vector storage means for sequentially reading the vector elements of said first and second vectors;
    detect means connected to said second read means for providing a partial vector end signal representing that a vector element read out by said first read means is a last vector element of one of said partial vectors, depending upon the vector elements read out by said second read means;
    operation means connected to said vector storage means for performing an operation on vector elements of said first vector sequentially read out from said vector storage means and for sequentially providing outputs corresponding to results of the operation;
    control means connected to said detect means and said operation means and responsive tdo said signal from said detect means and said outputs from said operation means for sequentially providing vector elements each representing a result of the operation on vector elements belong to a partial vector.

2. A vector processor according to claim 1, wherein only one vector element is provided in said second vector for each partial vector, and said control means includes means connected to said second read means for controlling said second read means to read a next vector element of the second vector in synchronism with the provision of the partial vector end signal.

3. A vector processor according to claim 2, wherein said vector elements of said second each vector have values corresponding to vector lengths of corresponding partial vectors.

4. A vector processor according to claim 3, wherein said detect means includes means connected to said first read means for providing the partial vector end signals based upon a number of vector elements read out by said first read means and said vector lengths.

5. A vector processor according to claim 1, wherein said control means includes means connected to said operation means and said first and second read means and responsive to an output of said operation means representing a predetermined value and provided before said partial vector end signal is provided for a partial vector under operation, for providing a result vector element for the partial vector under operation and for providing a control signal to said first and second read means; and
    wherein said first read means includes means responsive to said control signal for reading the first vector element of a partial vector next to said partial vector under operation instead of the next vector element of said partial vector under operation.

6. A vector processor according to claim 5, wherein said first means includes means for reading the first vector element of the next partial vector based upon a vector element of said second vector corresponding to said partial vector under operation.

7. A vector processor according to claim 6, wherein a vector element of said second vector represents a value corresponding to a vector length of a corresponding partial vector,
    wherein said detect means includes means for changing a vector element read out by said second read means by a predetermined amount in synchronism with each reading of a vector element by said first read means, and for generating the partial vector end signal when the value obtained after the changing reaches a predetermined value; and
    wherein said second read means includes means for providing said storage means with the address of the first vector element of the next partial vector element based upon the value obtained by said detect means by said changing before said detect means provides said partial vector end signal.

8. A vector processor according to claim 5, further comprising third read means connected to said storage means and said operation means for sequentially reading vector elements of a third vector from said storage means and for providing the vector elements to said operation means in synchronism with supply of the vector elements of said first vector;
    wherein said control means includes means connected to said first and second read means and to said another read means for providing the control signal to said first and second read means and another control signal to said third read means when all of the vector elements of the third vector are ready by said third read means; and
    wherein said third read means includes means responsive to said another control signal for starting reading of the third vector from the first vector element thereof.

9. A vector processor according to claim 1, wherein said storage means is a main storage.

10. A vector processor according to claim 1, further comprising a main storage, wherein said storage means includes plural vector registers connected to said main storage each for holding vector elements of a vector, and wherein said first and second read means are respectively operable in connection with first and second vector registers designated by a program instruction.

11. A vector processor, comprising:
    storage meeeans for holding vector elements;
    read means connected to said storage means for sequentially reading out vector elements from said storage means;
    operation means connected to said storage means for performing an operation on said read out vector elements and for sequentially providing outputs corresponding to results of the operation on said read out vector elements; and
    jump address data means for providing said read means with jump address data;
    wherein said read means includes:
    first means for sequentially generating sequential addresses to read the vector elements sequentially from said storage means;
    second means connected to said first means and said jump address data means for selectively providing an address of a vector element next in order generated by said first means and an address of a vector element different from said next vector element and designated by said jump address data.

12. A vector processor according to claim 11, wherein said storage means is a main storage capable of holding plural vectors; and said first means includes means for sequentially generating addresses for vector elements of a vector designated by a program instruction.

13. A vector processor according to claim 11, further comprising a main storage capable of holding plural vectors, wherein said storage means includes plural vector registers connected to said main storage and each capable of holding a vector, and said read means is operable to read vector elements from a vector register selected by a program instruction.

14. A vector processor according to claim 11, further including control means connected to said operation means and said read means for providing said read means with a control signal for selection of said jump address data in response to an output of said operation means.

15. A vector processor, according to claim 11, further including control means connected to said read means for providing said read means with a control signal for election of said jump address data in response to a number of vector elements already read by said read means.

16. A vector processor according to claim 15, further comprising:
another read means connected to said storage means and said operation means for sequentially reading out vector elements of another vector from said storage means to provide said operation means with said read out vector elements as operands therefor; and
detect means connected to said another read means for detecting whether or not all of the elements of said another vector ar already read;
wherein said control means includes means connected to said detect means and responsive to an affirmative detection result by said detect means for generating said control signal and for providing said another read means with another control signal to read said another vector again.

17. A vector processor comprising:
vector storage means for holding at least a group of vectors each comprised of vector elements;
first read means connected to said vector storage means for sequentially reading out vector elements of said group of vectors so that vector elements of one vector of said group of vectors are sequentially read out and then vector elements of the next vector of said group of vectors are sequentiallyl read out;
operation means connected to said vector storage means for performing an operation on each of said sequentially read out vector elements and for providing outputs each corresponding to the result of the operation performend on a respective vector element of said read out vector elements;
first detect means for providing partial end signals each indicative of an end of read out by said read means of all of the vector elements belonging to one of the groups of vectors currently subjected to an operation by said operation means;
control means connected to said operation means and said first detect means and responsive to one of said partial end signals for providing a data signal indicative of a result of processing of one vector of said group of vector currently receiving an operation, depending upon outputs of said operation means provided as results of the operation on vector elements of said one vector of said group of vectors.

18. A vector processor according to claim 17, wherein said vector storage means also hold a control vector for said group of vectors, said control vector being comprised of vector elements;
wherein said vector processor further includes second read means connected to said vector storage means for sequentially reading out vector elements of said control vector therefrom in synchronism with read operations by said first read means; and
wherein siad first detect means includes means connected to said vector storage means and responsive to read out vector elements of said control vector for detecting whether or not a vector element read out by said first read means is the last vector element of a vector of said group of vectors.

19. A vector processor according to claim 18, wherein said vector elements of said control vector each represent a number of vector elements included in one vector of said group of vectors.

20. A vector processor according to claim 17, further comprising:
write means connected to said vector storage means for sequentially writing data signals generates by said control means into said vector storage means.

21. A vector processor according to claim 17, wherein said control means includes means connected to said operation means and said first detect means and responsive to an output of said first detect means and responsive to an output of said operation means, which output provides a predetermined value prior to an end of read out of one of said group of vectors current being subjected to an operation, for providing a control signal and a data signal indicative of a result of the processing on said one vector; and
wherein said read means includes connected to said control means and responsive to said control signal for starting read out of a next vector of said group of vectors instead of reading any remaining vector elements of said one vector.

22. A vector processor according to claim 17, wherein said vector storage means also holds another vector comprising vector elements;
wherein said vector processor further includes:
(1) second read means connected to said vector storage means for sequentially reading vector elements of said another vector in synchronism with readout operations of said first read means and providing said read out vector elements of said another vector to said operation means so that a vector element of said another vector and a vector element of a vector of said group of vectors are provided as a pair of operands to said operation means;
(2) second detect means connected to said second read means for detecting and end of readout by said second read means of all of the vector elements of said another vector; and
wherein said control means comprises means connected to said operation means, said first and second detect means and said second read means and responsive either to one of said partial end signals or to said detection by said second detect means for providing a data signal indicative of a result of processing of said another vector and one vector of said group of vectors currently recieving an operation and providing a control signal to said second read means so that said second read means starts reading said another vector from a starting vector element thereof.

23. A vector processor according to claim 22, wherein said control means further includes means connected to said operation means and said first and second read means and responsive to an output of said operation means, which output provides a predetermined value prior to an end of readout of all of the vector elements of a vector of said group of vectors currently being subjected to an operation by said operation means and an end of readout of all of the vector elements of said another vector for providing a data signal indicative of a result of processing of said another vector and said one vector of said group of vectors currentlyl being operated on by said operation means and providing a control signal to said second read means and another control signal to said first read means; and wherein said first read means includes means connected to said control means and responsive to said another control signal for starting readout of the next one of said group of vectors instead of readout of any remaining vector elements of said one vector currently being operated on by said operation means.

24. A vector processor comprising:
vector storage means for holding a group of vectors, each comprised of vector elements, and another vector also comprised of vector elements;
first read means connected to said vector storage means for sequentially reading out vector elements of vectors of said group of vectors so that vector elements of one vector of said group of vectors are sequentially read out and then vector elements of the next one of said group of vectors are sequentially read out;
operation means connected to said vector storage means for performing an operation on each of said sequentially read out vector elements and for providing outputs each corresponding to the result of the operation on a respective vector one of said read out vector elements;
second read means connected to said vector storage means for sequentially reading vector elements of said another vector in synchronism with readout operations of said first read means and for providing read out vector elements to said operation means so that a vector element or said another vector and a vector element of said group of vectors are provided as a pair of operands to said operation means;
control means connected to said first and second read means for providing a control signal thereto;
wherein said first read means includes means responsive to said control signal for starting readout of the next vector of said group of vectors from a starting vector element thereof, instead of readout of any remaining vector elements of one of said group of vectors currently being operated on by said operation means; and
wherein said second read means includes means responsive to said control signal for re-starting reading of said another vector.

25. A vector processor according to claim 24, further comprising;
first detect means for providing partial end signals each indicative of an end of read out by said read means of all of the vector elements belonging to one vector of group of vectors currently being operated on by said operation means; and
second detect means connected to said second read means for detecting an end of read out by said second read means of all of the vector elements of said another vector;
wherein siad control means includes means connected to said first and second detect means and responsive to either to one of the partial end signals or to said detection by said second detect means for providing siad control singal.

26. A vector processor according to claim 25, wherein said vector storage means also holds a control vector for said group of vectors;
wherein said vector processor further includes third read means connected to said vector storage means for sequentially reading out vector elements of said control vector therefrom in synchronism with read operations by said first read means; and
wherein said first detect means includes means connected to said third control means and responsive to the read out vector elements of the control vector for detecting whether or not a vector element read out by said read means is the last vector element of a vector of said group of vectors.

27. A vector processor according to claim 26, wherein the vector elements of said control vector each represent a number of vector elements included in one vector of said group of vectors.

28. A vector processor according to claim 24, wherein said control means includes means connected to said operation means and responsive to an output of said operation means having a predetermined value for providing said control signal.

29. A vector processor comprising:
vector storage means for holding at least a group of vectors each comprised of vector elements;
first read means connected to said vector storage means for sequentially generating addresses of vector elements of said group of vectors so as to read vector elements from said vector storage means according to a predetermined order of vectors and according to a predetermined order of vector elements within each vector of said group of vectors;
operation means connected to said vector storage means for performing an operation on each of said sequentially read out vector elements and providing outputs each corresponding to a result of the operation on a respective one of said read out vector elements;
control means connected to said first read means for controlling said read means so as to skip reading of vector elements not yet read out of one vector of said group of vectors currently being operated on by said operation means so as to continue the reading of vector elements starting from a vector which is next in order to said one vector.

30. A vector processor according to claim 29, wherein said control means includes means for performing said controlling in response to an output of said operation means having a predetermined value.

31. A vector processing according to claim 29, wherein said vector storage means also holds another vector comprisesd of vector elements;
wherein said vector storage means further includes second read means connected to said vector storage means for sequentially reading vector elements of said another vector in synchronism with readout operations of said first read means and for providing the read out vector elements to said operation means so that a vector element of said another vector and a vector element of a vector of said group of vectors are provided as a pair of operands to said operation means; and wherein said control means includes means connected to said second read means and responsive to an end of read out thereby of all of the vector elements of said another vector for performing said controlling and for controlling said second read means so as to re-start reading of said another vector.

* * * * *